(12) United States Patent
Aravamudan

(10) Patent No.: US 8,480,250 B2
(45) Date of Patent: Jul. 9, 2013

(54) FURNITURE LIGHTING

(76) Inventor: Gosakan Aravamudan, Bangalore (IN)

( * ) Notice: Subject to any disclaimer, the term of this patent is extended or adjusted under 35 U.S.C. 154(b) by 198 days.

(21) Appl. No.: 12/995,670

(22) PCT Filed: Jun. 3, 2009

(86) PCT No.: PCT/IN2009/000319
§ 371 (c)(1),
(2), (4) Date: Dec. 2, 2010

(87) PCT Pub. No.: WO2009/157017
PCT Pub. Date: Dec. 30, 2009

(65) Prior Publication Data
US 2011/0122607 A1    May 26, 2011

(30) Foreign Application Priority Data
Jun. 4, 2008    (IN) ............................ 1366/CHE/2008

(51) Int. Cl.
*F21V 33/00*    (2006.01)
(52) U.S. Cl.
USPC ............................ 362/192; 362/193; 362/127
(58) Field of Classification Search
USPC ................. 362/127, 132–134, 154, 155, 192, 362/193
See application file for complete search history.

(56) References Cited

U.S. PATENT DOCUMENTS

| 1,556,492 | A | * | 10/1925 | Coleman | 362/192 |
| 4,332,006 | A | * | 5/1982 | Choe | 362/193 |
| 4,360,860 | A | * | 11/1982 | Johnson et al. | 362/192 |
| 7,699,499 | B2 | * | 4/2010 | Liao | 362/276 |
| 2007/0019405 | A1 | * | 1/2007 | Chang et al. | 362/192 |
| 2008/0123330 | A1 | * | 5/2008 | Sullivan | 362/192 |

* cited by examiner

*Primary Examiner* — Laura Tso
(74) *Attorney, Agent, or Firm* — Ash Tankha; Lipton, Weinberger & Husick

(57) ABSTRACT

A lighting apparatus for providing illumination within a furniture module is provided. The lighting apparatus comprises a means of capturing kinetic energy of a moving part of the furniture module, a means for converting the kinetic energy into electric energy, and a means of converting the electric energy into light energy for lighting up the space within the furniture module. The lighting apparatus is attached to the furniture module. The means of converting kinetic energy into electric energy is, for example, a mechanical gear based assembly or a piezoelectric crystal based assembly. The light source is activated using a rechargeable battery or by using a continuously generated electric current in the short duration of the operation of the furniture module. The lighting apparatus is either directly attached to the furniture module or is an integral part of a furniture hinge.

6 Claims, 13 Drawing Sheets

US 8,480,250 B2

FURNITURE LIGHTING

CROSS REFERENCE TO RELATED APPLICATIONS

This application claims the benefit of the following patent applications:
1. Provisional patent application number 1366/CHE/2008 titled "Furniture Lighting", filed on Jun. 4, 2008 in the Indian Patent Office.
2. PCT application number PCT/IN2009/000319 titled "Furniture Lighting", filed on Jun. 3, 2009 in the Indian Patent Office.

BACKGROUND

This invention, in general, relates to a light generation device and more particularly relates to providing illumination within a furniture module.

There is a need for lighting in enclosures, such as in the spaces within a furniture cabinet. Kitchen cabinets, desk drawers, and wardrobes are a few examples of furniture that require lighting within their enclosed spaces. Typically, furniture lighting will require a power connection to the main electrical line. Wires within the furniture module are difficult to incorporate and are also not aesthetically pleasing. Batteries may be used to power the light source in the furniture, however, batteries have limited life and these batteries need to be changed frequently.

Hence, there is a need for an apparatus that illuminates furniture assemblies that do not require the use of throwaway batteries, or does not need to be connected to the main power source, and that is aesthetically pleasing.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

Disclosed herein is a lighting apparatus for providing illumination within a furniture module. The lighting apparatus comprises a means of capturing kinetic energy of a moving part of the furniture module, a means for converting the kinetic energy into electric energy, and a means of converting the electric energy into light energy for lighting up the space within the furniture module. The lighting apparatus is attached to the furniture module. The means of converting kinetic energy into electric energy is, for example, a mechanical gear based assembly or a piezoelectric crystal based assembly. The light source is activated using a rechargeable battery or by using a continuously generated electric current in the short duration of the operation of the furniture module. The lighting apparatus is either directly attached to the furniture module or is an integral part of a furniture hinge. The light energy may be either utilized continuously or regulated through a micro switch.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
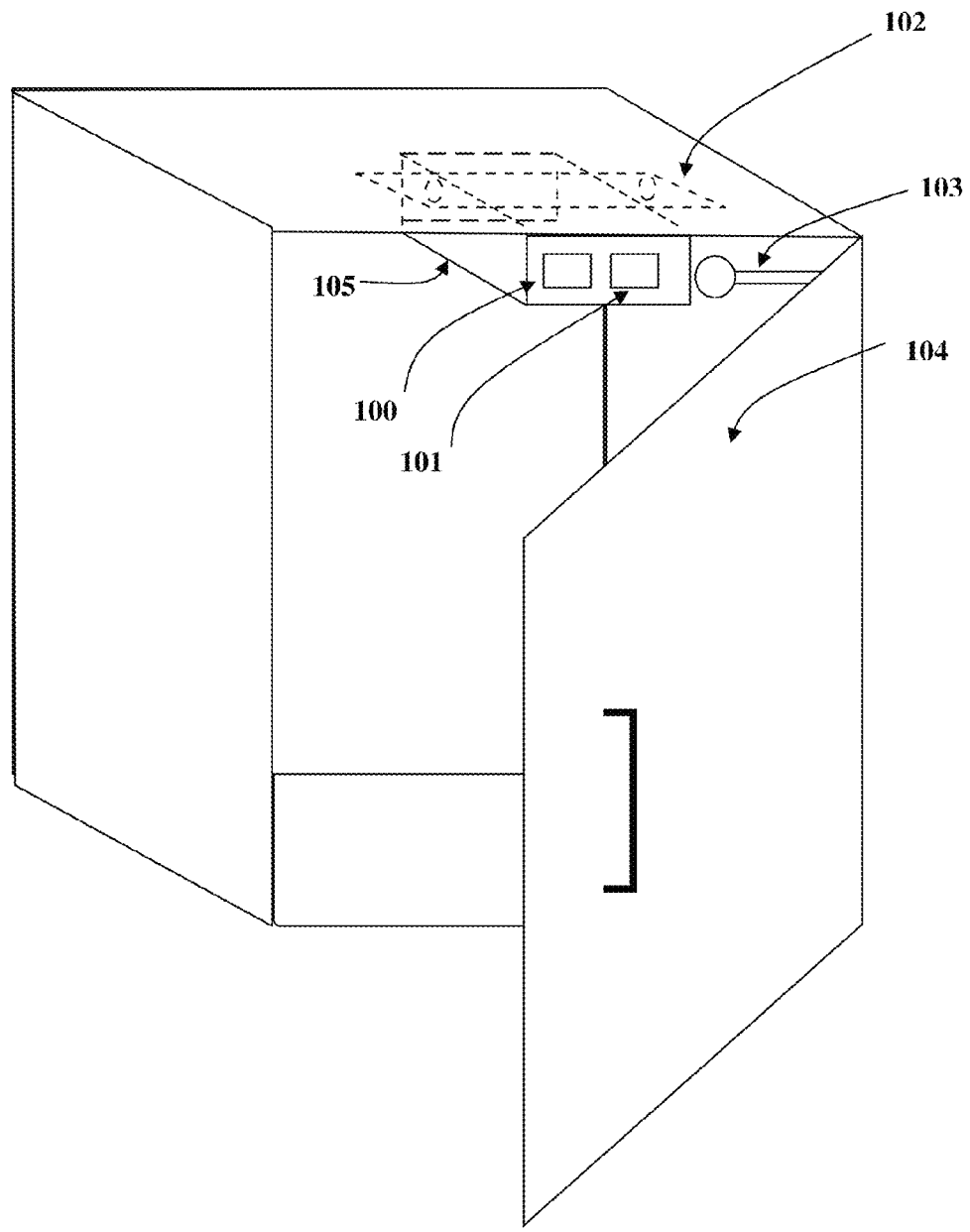
FIG. 1 illustrates a lighting apparatus for providing illumination within a furniture module.

FIG. 1 illustrates a lighting apparatus 105 for providing illumination within a furniture module. The lighting apparatus 105 comprises a means 100 of capturing kinetic energy of a moving part 104 of the furniture module, a means 101 for converting the kinetic energy into electric energy, and a means of converting the electric energy into light energy for lighting up the space within the furniture module. The lighting apparatus 105 is attached to the furniture module through an attachment 102.

Figure 2A:
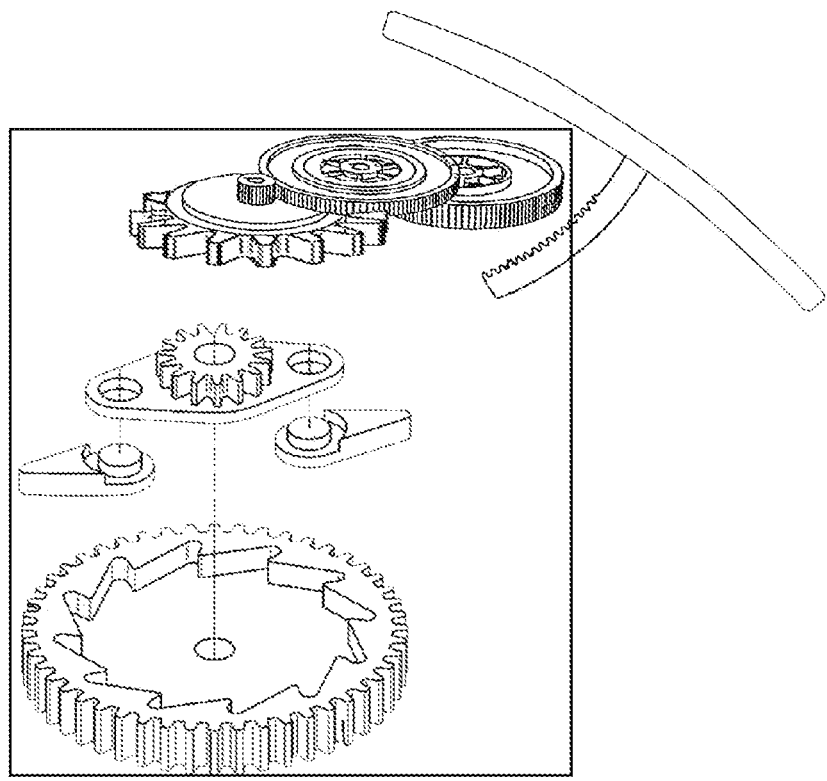
FIGS. 2A-2B illustrate a geared lighting apparatus for providing illumination within a furniture module.
Figure 2B:
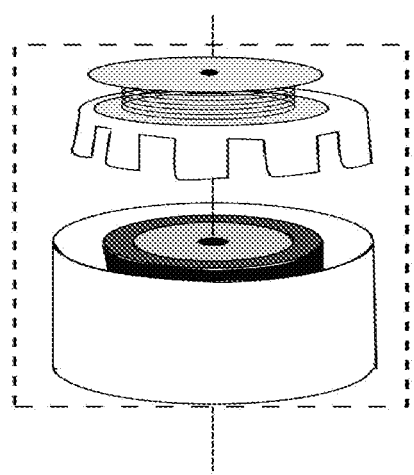

FIGS. 2A-2B illustrate a geared lighting apparatus for providing illumination within a furniture module. The lighting apparatus comprises a compressible spring or a coil spring (not shown in FIG. 1), a rotor 201a, a stator 201b, and gear assemblies 202. Typically, during manual operation of a movable part of the furniture module, mechanical energy is generated. For example, on opening of the furniture module, the mechanical rotation of the door 104 generates mechanical energy. The movable part is, for example, a hinged door 104 or a sliding drawer 801. The compressible spring or a coil spring 503 stores the mechanical energy generated due to the manual operation of the movable part of the furniture module. The stator 201b may be a magnet fixed on an axis. The stator 201b provides a constant magnetic field. The rotor 201a rotates in the constant magnetic field. The rotor 201a comprises multiple conductor windings. The conductor windings within the magnetic field convert the mechanical energy from the manual operation into a pulsing direct electric current. The gear assemblies 202 transfer the stored mechanical energy to the rotor 201a. A commutator may be needed to produce direct current. The transferred mechanical energy causes the rotation of the rotor 201a in the constant magnetic field, thereby generating electric energy. The electric energy generated due to the rotation of the rotor 201a in the constant magnetic field is utilized to provide illumination to the spaces within the furniture module.

Figure 3:
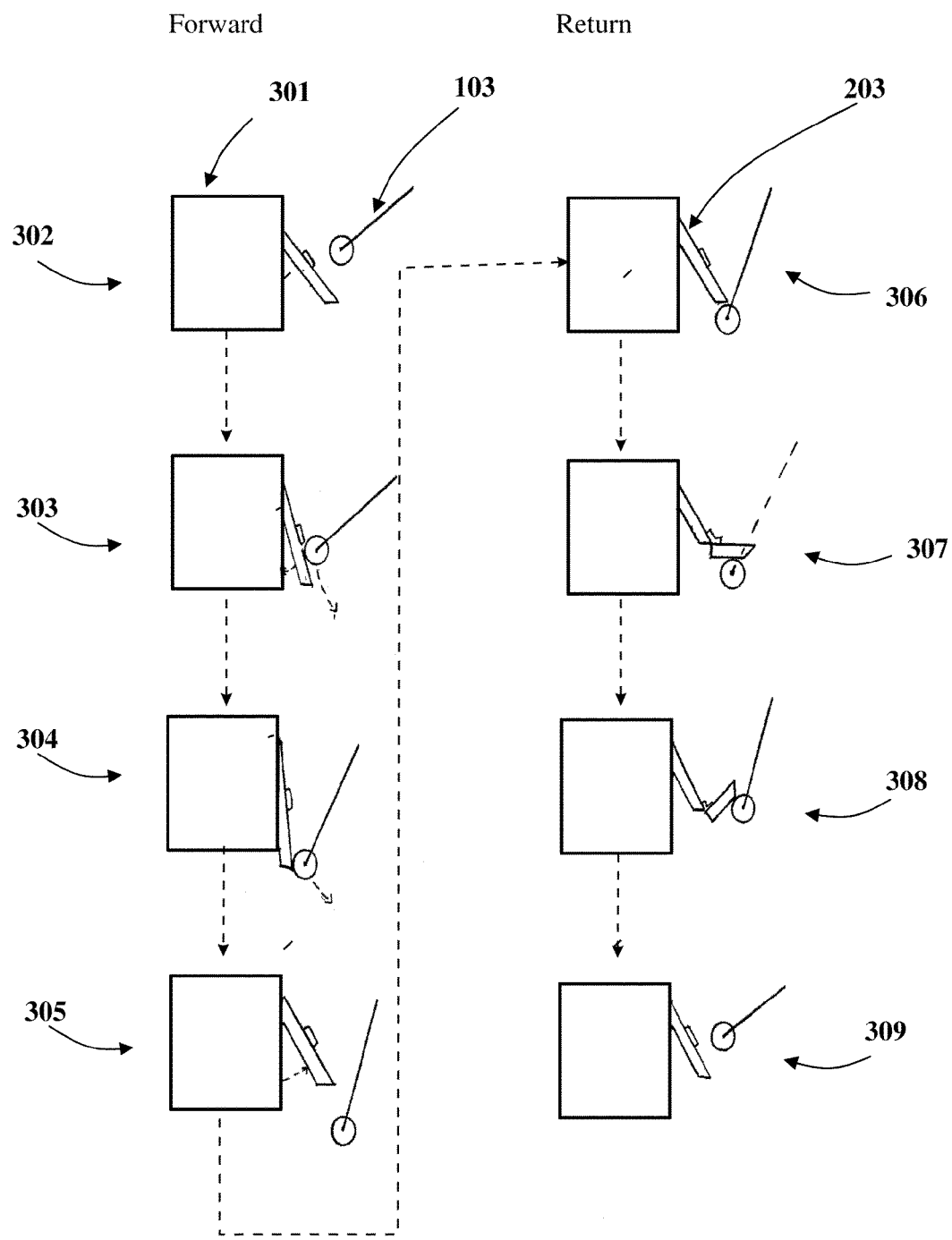
FIG. 3 exemplarily illustrates interaction between the furniture module and an electric energy generator.
Figure 5:
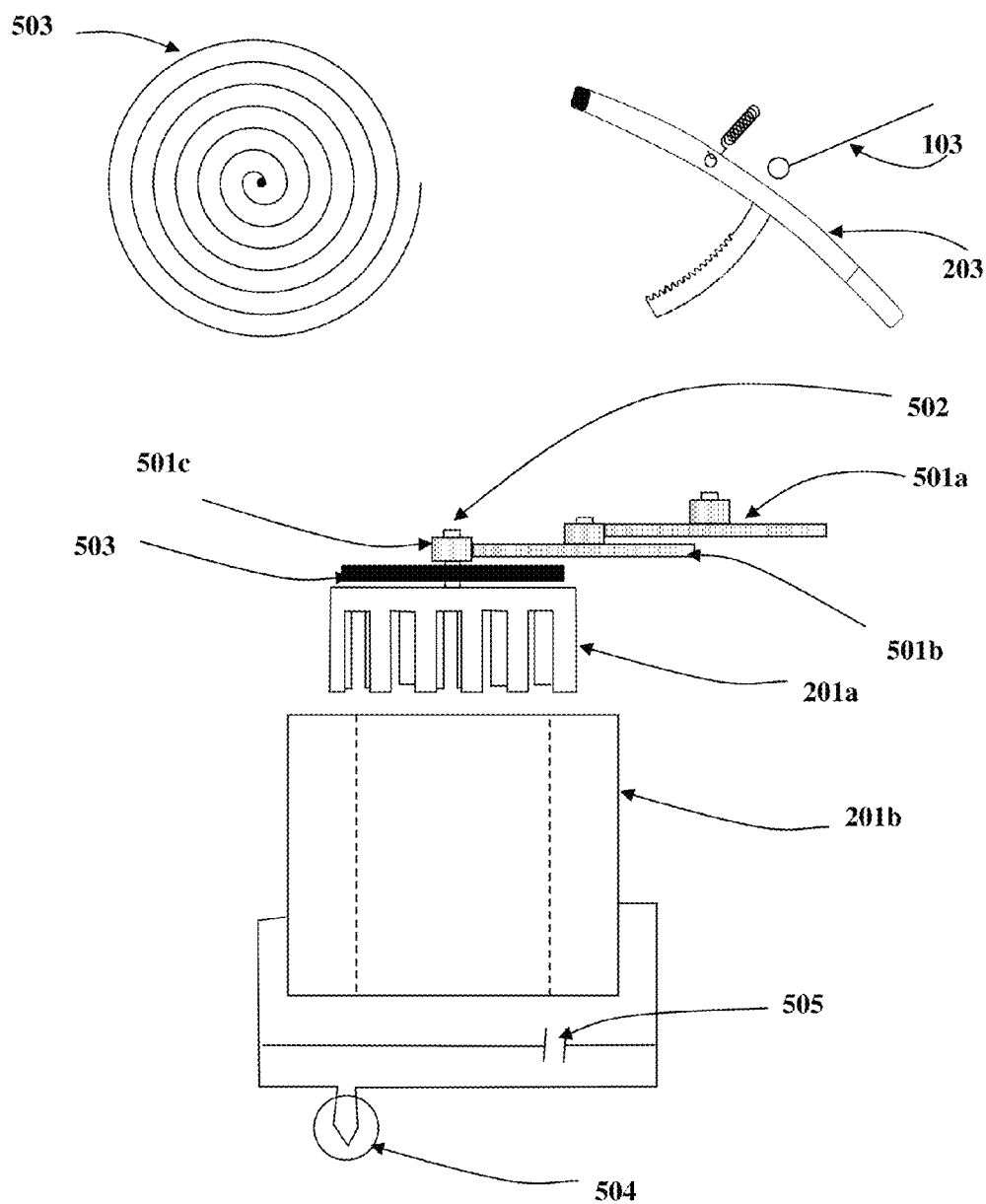
FIG. 5 exemplarily illustrates a lighting apparatus with a spiral coil spring as the means for storing mechanical energy.

FIG. 3 exemplarily illustrates interaction between the furniture module and an electric energy generator 301. The common housing enclosing the storing means, the stator 201b, the rotor 201a, and the gear assemblies 202 is herein referred as the electric energy generator 301. FIG. 3 exemplarily illustrates a series of interactions 302, 303, 304, 305, 306, 307, 308, and 309 between the electric energy generator 301 and a striker or arm 103 attached to the movable part of the furniture module. The movable part is, for example, a hinged door 104 or a sliding drawer 801. A striker or arm 103 presses against the lever 203 of the electric energy generator 301 on manual operation of a movable part of the furniture module connected to the hinge 1005. The lever 203 is a two-piece arm that can fold back on the return as illustrated in the FIG. 3. The mechanical energy transferred through the lever 203 to the electric energy generator 301 is stored in a compressible spring or a spiral coil spring 503. The striker or arm 103 slides off the lever 203 after a predetermined angular rotation is achieved as illustrated in FIG. 3. The striker or arm 103 sliding off the lever 203 causes a sudden release of energy stored in the compressible spring or the spiral coil spring 503 as illustrated in FIG. 5. This sudden release of energy is transferred to the rotor 201a through the gear assemblies 202. The rotation of the rotor 201a in the constant magnetic field generates electric energy that powers a light source.

The assembly with the lever 203 may be attached to either the moveable or the fixed part of the furniture module, preferably on the fixed part of the furniture module, by a mechanical means such as a bolt and a nut, screws and studs or through a snap-fit mechanism. Another method of attaching the assembly with lever 203 to the furniture module is by chemical means such as high strength adhesives; epoxy, polyurethane, acrylic or cyanoacrylate types. The assembly comprising the electric energy generator 301 may be attached directly on the stationary part or the moveable part of the furniture module.

Figure 4:
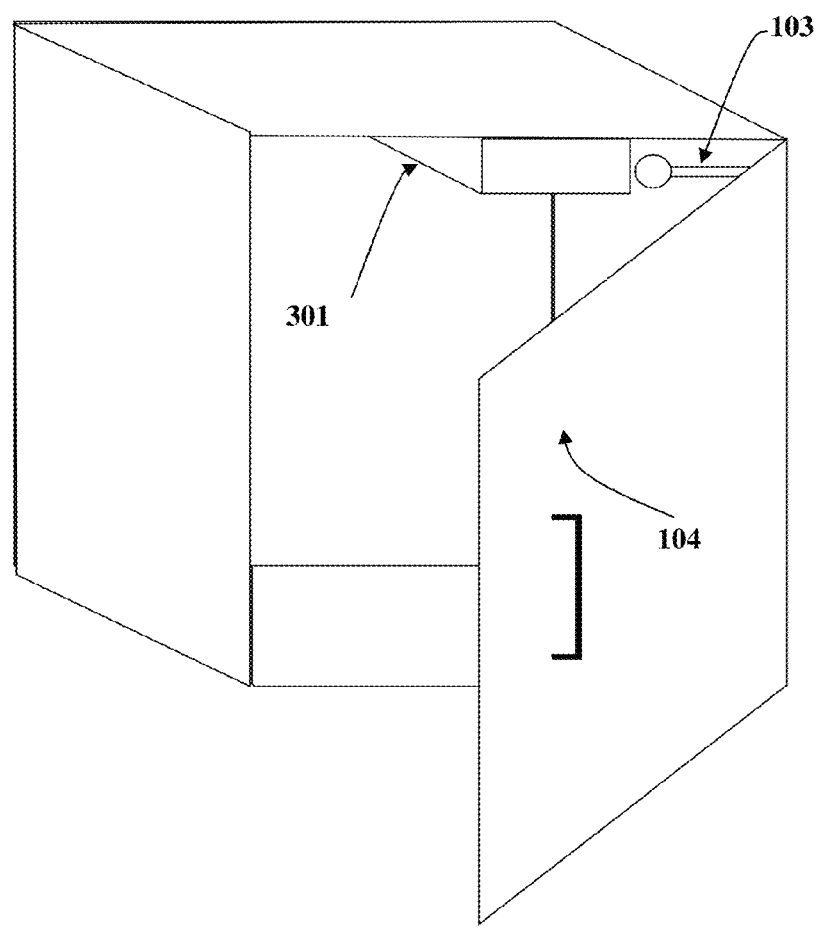
FIG. 4 exemplarily illustrates a lighting apparatus attached to a furniture module.

FIG. 4 exemplarily illustrates a lighting apparatus attached to a furniture module. The lighting apparatus comprises an electric energy generator 301 attached to the fixed part of the furniture module, the striker or arm 103 attached to the moveable part of the furniture module, that is a door 104. During a typical operation, as the door 104 is opened, the striker or arm 103 presses against the lever 203 and slides off the lever 203. The mechanical motion is converted to electric energy through an assembly of gears 202 and spiral coil spring 503 or compressive springs in the electric energy generator 301 activating a light source.

FIG. 5 exemplarily illustrates a lighting apparatus with a spiral coil spring 503 as the means for storing mechanical energy. In another embodiment, a spiral coil spring 503 is utilized as the means of energy storage. The lever 203 motion, due to the movement of the striker or arm 103 on the moveable part of the furniture module, turns a series of gears. The gear motion is further transferred to a spiral coil spring 503. One end of the spiral coil spring 503 is attached to the shaft 502. The other end of the spiral coil spring 503 is attached to the frame of the stator 201b. The shaft 502 is connected to the rotor 201a. The lighting apparatus comprises a stator 201b, a rotor 201a, a spiral coil spring 503, and a gear assembly comprising gears 501a, 501b, and 501c.

During a typical manual operation, the striker or arm 103 passes through its line of motion pressing the lever 203. As a result, the gear 501a rotates which in turn rotates the gear 501b. The gear 501b in turn rotates the gear 501c. The rotary motion of the gear 501c is transferred to the spiral coil spring 503 through the shaft 502. As the spiral coil spring 503 winds, the spiral coil spring 503 stores mechanical energy. When the arm 103 traverses past the end of the lever 203, the spiral coil spring 503 unwinds. The unwinding of the spiral coil spring 503 causes rotation of the rotor 201a. The motion of the rotor 201a within a magnetic field generates electric current that charges a capacitor 505 and power up a light source 504.

In another embodiment, a rack and pinion arrangement is incorporated to transfer the mechanical energy to the electric energy generator 301. The rack and pinion arrangement is, for example, one or a combination of metal, plastic or composite. The rack 601 is, for example, of a continuous or intermittent type. The pinion gear 602a is connected to a shaft 602. The shaft 602 is connected to spiral coil spring 503. The spiral coil spring 503 is attached at one end to the shaft 602 and to the frame of the stator 201b at the other end in the same plane. The pinion gear 602b is engaged to the rack 601 rotating in clockwise direction and moves freely in the anti-clockwise direction. A combination of spiral coil spring 503 and a guiding slot 603 is utilized to generate electric current.

Figure 6A:
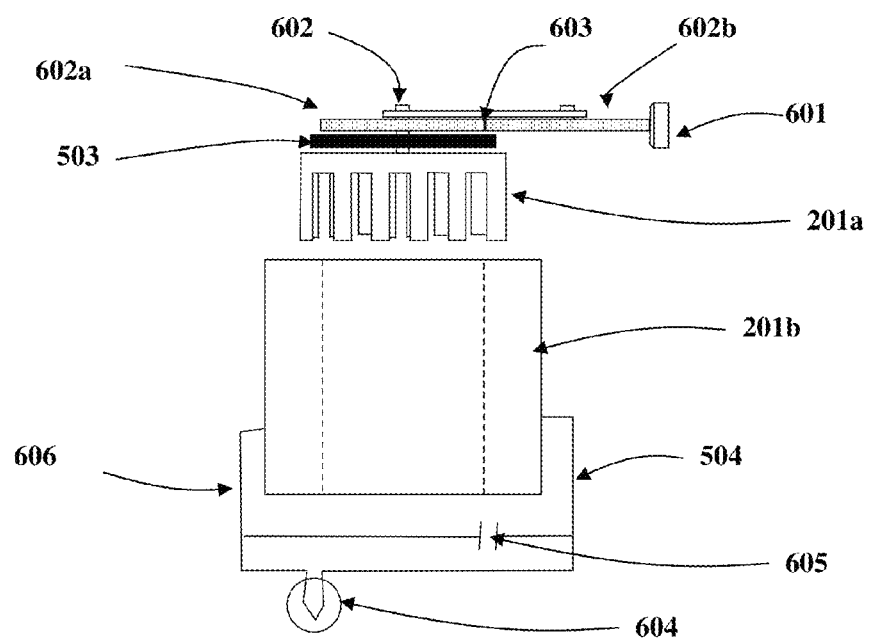
FIGS. 6A-6C exemplarily illustrate a geared lighting apparatus with a rack and pinion arrangement to convert linear motion to rotary motion.
Figures 6B, 6C:
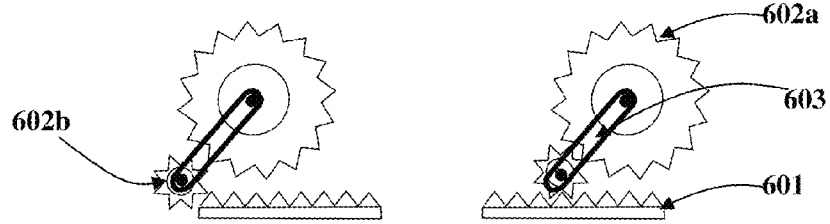
Figure 8:
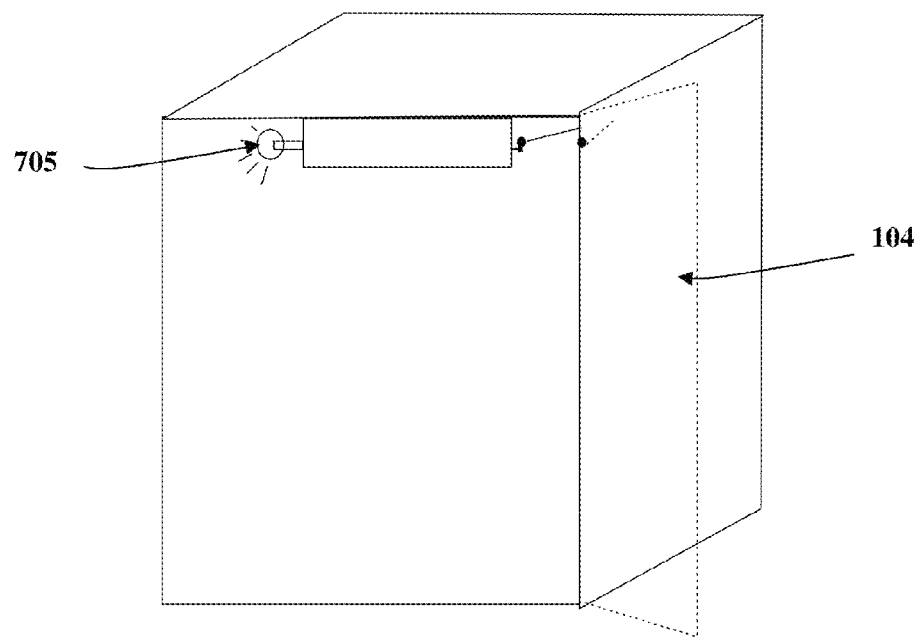
FIG. 8 illustrates a piezoelectric based lighting apparatus attached to a furniture module.

FIGS. 6A-6C exemplarily illustrate a geared lighting apparatus with a rack and pinion arrangement to convert linear motion to rotary motion. The lighting apparatus comprises a set of gears, pinion gear 602a and, gear 602b that moves freely inside a guiding slot 603. The pinion gear 602a rotates freely inside the guiding slot 603. The lighting apparatus further comprises a shaft 602 that connects to the pinion gear 602a and the rotor 201a. The shaft 602 further comprises a spiral coil spring 503 that is attached at one end to the shaft 602 and to the stator 201b frame at the other end in the same plane. The lighting apparatus is connected to an electrical circuit comprising a capacitor 605, a light source 604 and a conductor 606. When the drawer 801 as illustrated in FIG. 8 is pulled out, the gear 602b encounters the rack 601 and gets pushed within the guiding slot 603 and engages the rack 601 to the pinion gear 602a. The engagement of the rack 601 and the pinion 602a translates the linear motion into rotary motion that rotates the rotor 201a. The shaft 602 carrying the pinion gear 602a turns the rotor 201a and the spiral coil spring 503. At the end of the rack 601, when the gear 602b disengages from the rack 601, the stored mechanical energy in the spiral coil spring 503 gets released through uncoiling. The uncoiling of the spiral coil spring 503 turns the rotor 201a, thereby generating the electric current needed to activate the light source 604. The capacitor 605 represents a storage medium for electric charge that can be discharged to keep the light source 604 active for longer periods of time.

Figure 7A:
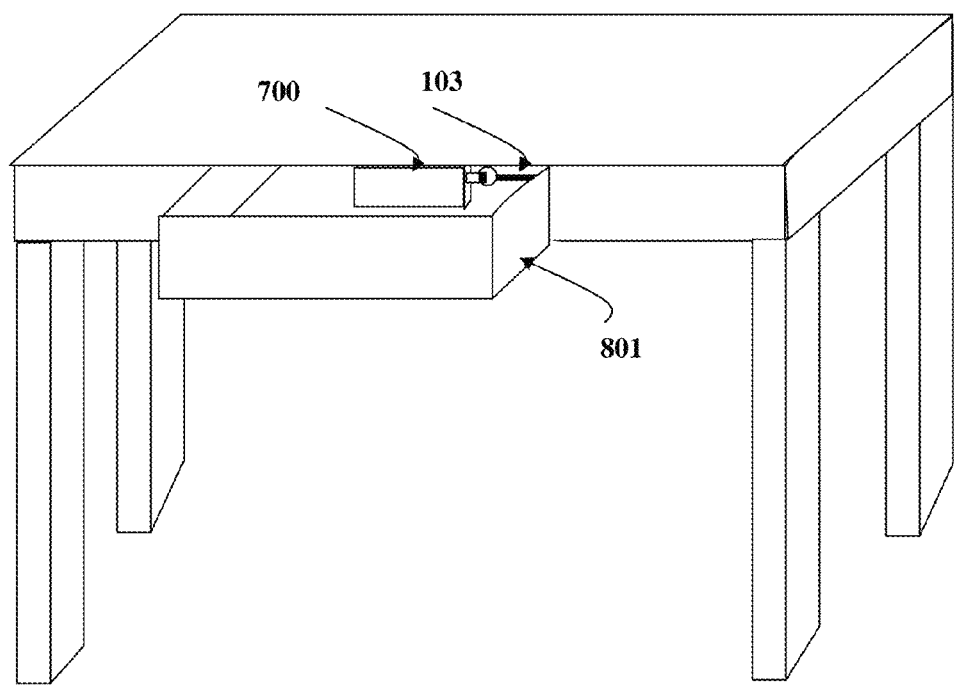
FIG. 7A is an illustration of a piezoelectric crystal based lighting apparatus attached to a furniture module.
Figure 7B:
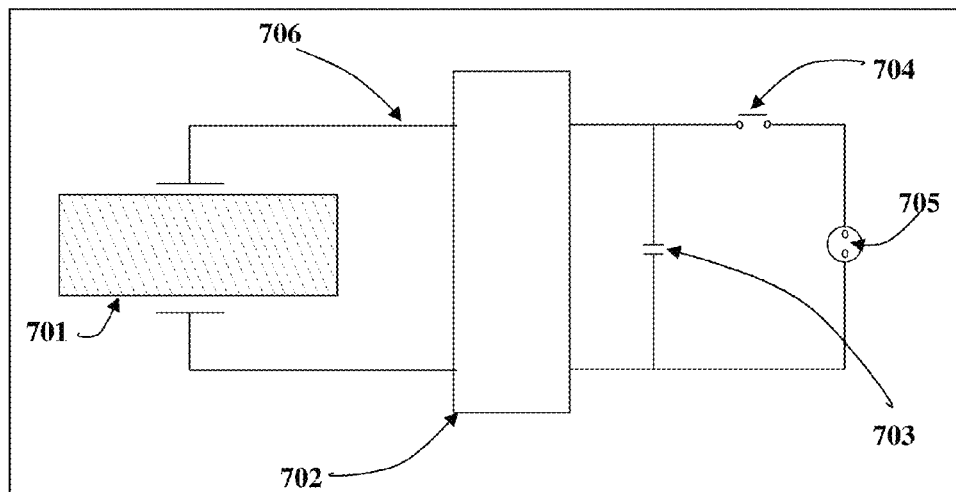
FIG. 7B exemplarily illustrates a piezoelectric crystal based circuit.

FIG. 7A is an illustration of a piezoelectric crystal based lighting apparatus attached to a furniture module. The lighting apparatus comprises a piezoelectric crystal based assembly 700 and a striker or arm 103. The piezoelectric crystal based assembly 700 comprises a piezoelectric crystal assembly 701, a rectifier 702, a capacitor 703, a switch 704, and a light source 705. The piezoelectric crystal assembly 701 generates an electric potential on application of a mechanical stress. The mechanical operation of the furniture module produces the required mechanical stress to generate electric energy. The mechanical stress so generated transfers to the piezoelectric crystal assembly 701 mounted on a substrate 701a through a striker or arm 103 that strikes the extended substrate end. The stress transfer results in dimensional change in the piezoelectric crystals 701b leading to generation of an electric potential. The electric potential so generated due to the applied mechanical stress produces an electric current that illuminates the space within the furniture module. The piezoelectric crystal assembly 701 is, for example, an artificial or natural type. Some examples of piezoelectric crystals are aluminum orthophospate, quartz, tourmaline, topaz, rochelle salt, polyvinylidene fluoride, barium titanate, lead zirconate, lithium sulfate, etc. FIG. 7B illustrates a piezoelectric crystal based circuit comprising one or more of piezoelectric crystal layers 701b, a rectifier 702, a capacitor 703, a light source 705, a switch 704 and a conductor 706. The energy storage medium is, for example, a capacitor, a battery, or a rechargeable battery. The light source 705 is, for example, a light emitting diode (LED).

Figure 7C:
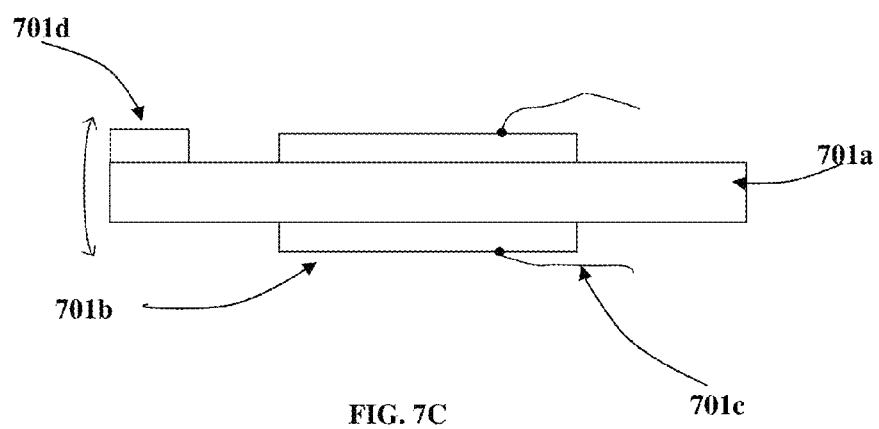
FIG. 7C exemplarily illustrates a piezoelectric crystal based assembly.

FIG. 7C illustrates a piezoelectric crystal based assembly 700 comprising a substrate 701a, a piezoelectric crystal 701b layer on either side of the substrate 701a, a pair of leads 701c and a weight 701d. The piezoelectric crystal layer 701b may comprise one or more piezoelectric crystal layers. The substrate 701a may be of phosphorous bronze type. As the striker or arm 103 strikes the weight 701d attached at the end of the substrate 701a, the piezoelectric crystals 701b vibrate in the direction of the striker or arm 103 line of motion. The vibrations generate potential difference that results in the flow of electric current to the energy storage medium until the switch 704 closes the circuit. The closing of the circuit triggers the light source 705. For example, a capacitor 703 having a value of 0.2 microfarads and 400 volts D.C. results in the light source 705 lighting for 10 seconds after the piezoelectric crystal is deactivated.

FIG. 8 illustrates a piezoelectric based lighting apparatus attached to a furniture module. When a furniture door 104 is opened, the striker or arm 103 attached to the door 104 surface strikes the weight 701d mounted at the end of the piezoelectric substrate 701a as the striker or arm 103 passes through its line of motion. The strike results in the oscillation of the piezoelectric substrate 701a which leads to the vibration in the piezoelectric crystal layers 701b. The vibration in the piezoelectric crystal layers 701b generates an electric current that lights up the light source 705 by closing a circuit comprising a rectifier 702, a capacitor 703, a switch 704, and a conductor 706.

Figure 9:
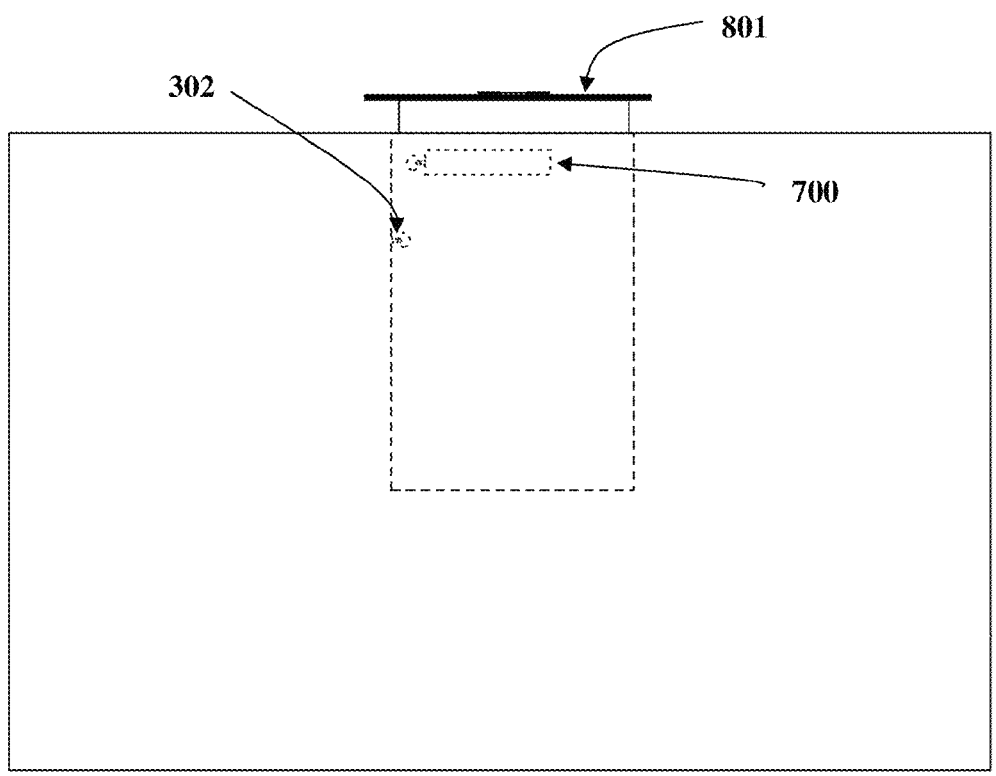
FIG. 9 illustrates a top view of a piezoelectric crystal based lighting apparatus attached to a drawer.

FIG. 9 illustrates a top view of a piezoelectric crystal based lighting apparatus attached to a drawer 801. The lighting apparatus comprises a piezoelectric crystal based assembly 700 and an arm or striker 103. The piezoelectric crystal based assembly 700 further comprises one or more of piezoelectric crystal layers 701b mounted on a piezoelectric substrate 701a at the end of which a weight 701d is mounted. The piezoelectric crystal based assembly 700 further comprises a rectifier 702, a capacitor 703 and a light source 705 connected in a circuit through a conductor 706. A striker or arm 103 is mounted on the moveable part of the furniture, drawer 801. When the drawer 801 is pulled out, the striker or arm 103 strikes the piezoelectric weight 701d and results in the oscillation of the piezoelectric substrate 701a. The oscillations cause the piezoelectric crystal layers 701b to change dimensions and generate a potential difference that causes the electric current to flow through the conductor 706 and activate the light source 705.

Figure 10:
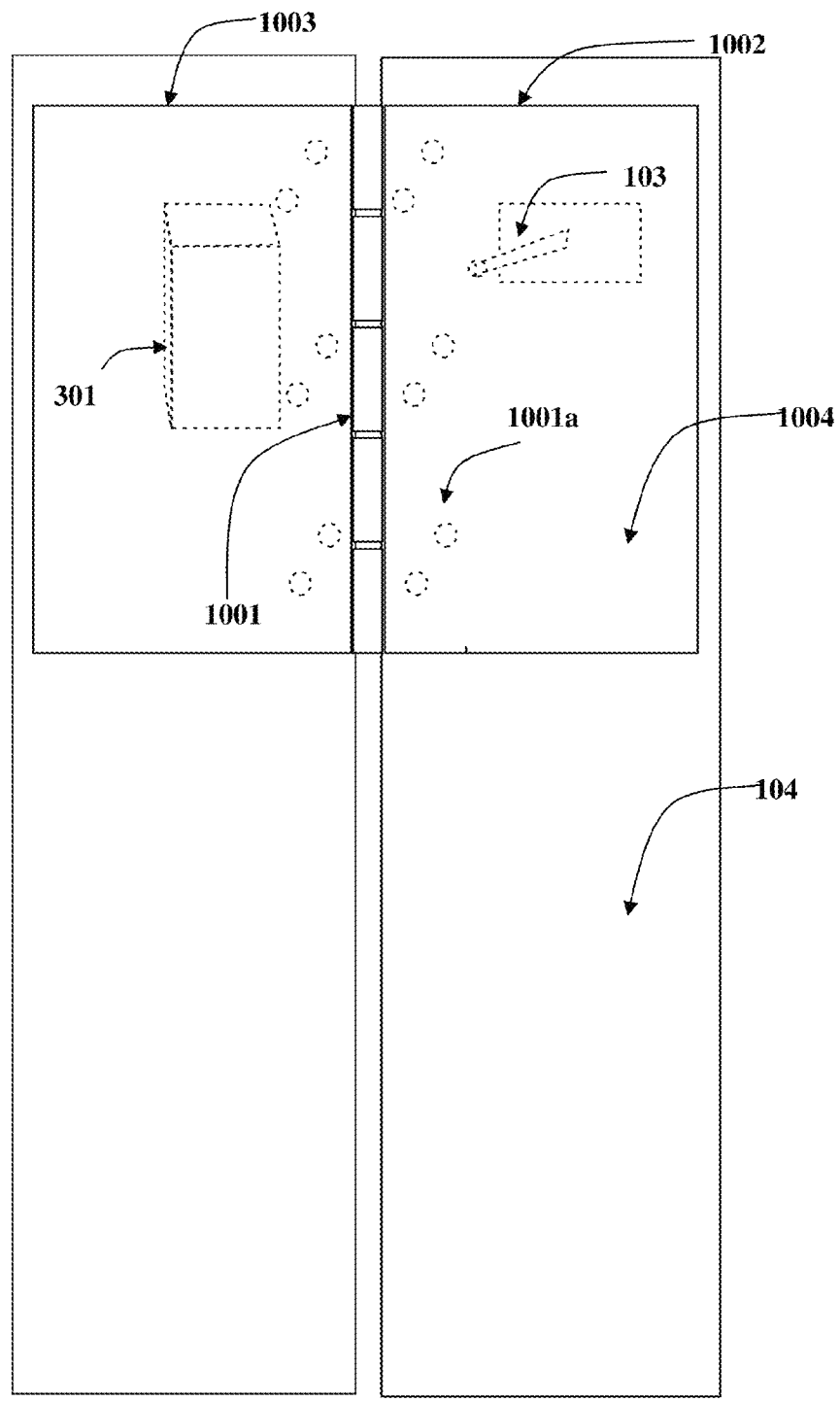
FIG. 10 illustrates a gear based lighting apparatus integrated within the hinge of a furniture module.

In another embodiment, the gear based lighting apparatus is integrated into the hinge 1005 of the furniture module. FIG. 10 illustrates a gear based lighting apparatus integrated into the hinge 1005 of a furniture module. The gear based lighting apparatus comprises two hinge halves: a stationary half 1001, and a moveable half 1002, an electric energy generator 301, a mounting plate 1003, an arm or striker 103, and a mounting plate 1004. The two halves of the hinge: stationary half 1001 and the moveable half 1002 have holes 1001a to enable screw attachment of the hinge to the furniture. When a door 104 is opened, the striker or arm 103 presses the lever 203 of the electric energy generator 301. The electric energy generator 301 is illustrated in FIG. 3. When the striker or arm 103 traverses past the lever 203, the mechanical energy stored in the electric energy generator 301 releases and electric current is generated. The generated electric current charges a capacitor 605 and activates the light source 604.

Figure 11A:
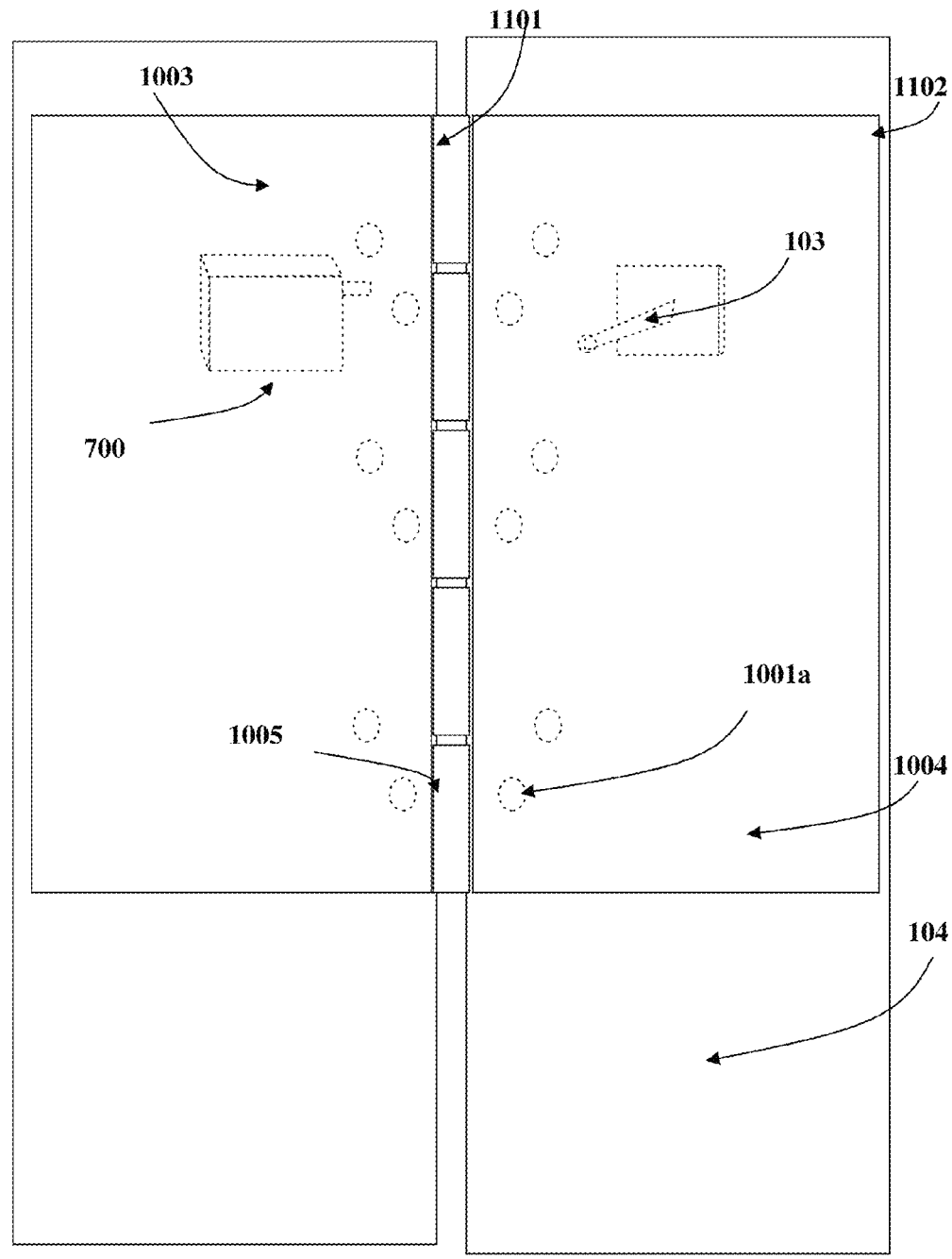
FIGS. 11A-11B illustrate a piezoelectric based lighting apparatus integrated within a hinge of the furniture module.
Figure 11B:
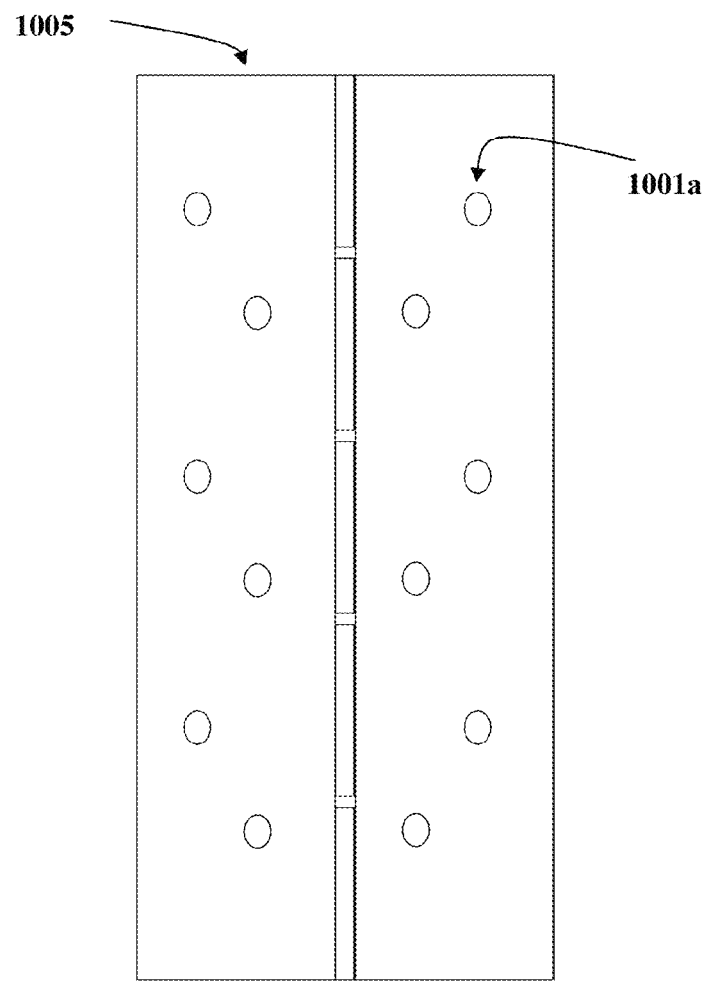

FIG. 11A illustrates a piezoelectric based lighting apparatus integrated into a hinge of the furniture module. The piezoelectric based lighting apparatus comprises two hinge halves: a stationary half 1101, a moveable half 1102, a piezoelectric crystal based assembly 700, a mounting plate 1003, a striker or arm 103, and a mounting plate 1004. The two halves of the hinge: stationary half 1101 and the moveable half 1102 have holes 1001a to enable screw attachment of the hinge to the furniture. When the door 104 is opened, the striker or arm 103 attached to the mounting plate 1004 strikes the weight 701d mounted at the end of the piezoelectric substrate 701a as it passes through its line of motion. The strike results in the oscillation of the piezoelectric substrate 701a which leads to the vibration of the piezoelectric crystal layers 701b. The vibration in the piezoelectric crystal layers 701b generates an electric current through the circuit comprising a rectifier 702, a capacitor 703, a switch 704 and a conductor 706, thereby powering up a light source 705. FIG. 11B illustrates a hinge comprising holes 1101a.

In another embodiment, a rechargeable battery is used to store and release the energy in the gear based lighting apparatus. The mechanical energy generated when the drawer 801 is pulled out gets converted to electric energy through the electric energy generator 301. When the drawer 801 is pushed back to its closed position, the circuit to light source breaks, and the mechanical energy so generated gets stored in the rechargeable battery for subsequent use. A microswitch connected in the circuit of the light opens and closes the circuit according to the movement of the drawer 801. During the forward motion, the circuit is closed and the light glows. On the backward motion of the drawer 801, the circuit is open so that the light is put off to conserve the charge in the rechargeable battery. The microswitch regulates flow of the electric energy.

In another embodiment, a rechargeable battery is used to store and release the energy in the piezoelectric crystal based lighting apparatus. The mechanical energy that is generated when the drawer 801 is pulled out, is converted to electric energy through the electric energy generator 301. When the drawer 801 is pushed back to its closed position, the circuit to light source breaks, and the electric energy so generated gets stored in the rechargeable battery for subsequent use. A microswitch connected in the circuit of the light opens and closes the circuit according to the movement of the drawer 801. During the forward motion, the circuit is closed and the light glows. On the backward motion of the drawer 801, the circuit is open so that the light is put off to conserve the charge in the rechargeable battery.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A lighting apparatus for providing illumination within a furniture module, comprising:
    a means of capturing kinetic energy of a moving part of said furniture module, said means of capturing kinetic energy comprising:
        a lever arm mounted on a stationary part of said furniture module and an arm mounted on a moveable part of said furniture module; and
        said lever arm configured to rotate a series of gears and a spring coil due to motion of said lever arm, leading to storage of mechanical energy that gets released on the return of said lever arm;
    a means of converting said kinetic energy into electric energy;
    a means of converting said electric energy into light energy; and
    a means of attaching said lighting apparatus on said furniture module.

2. The lighting apparatus of claim 1, further comprising a rechargeable battery for storing and releasing said electrical energy.

3. The lighting apparatus of claim 1, further comprising a means of regulating flow of said electric energy.

4. The lighting apparatus of claim 1, wherein said means of attaching said lighting apparatus on said furniture module is a hinge.

5. A lighting apparatus for providing illumination within a furniture module, comprising:
    a means of capturing kinetic energy of a moving part of said furniture module, said means of capturing kinetic energy comprising:
        a piezoelectric crystal based assembly comprising a piezoelectric crystal substrate;
        a capacitor; and
        said moving part of said furniture module configured to strike a piezoelectric crystal substrate of said piezoelectric crystal based assembly, leading to generating an electric energy by said piezoelectric crystal mounted on said piezoelectric crystal substrate;
    a means of converting said electric energy into light energy; and
    a means of attaching said lighting apparatus on said furniture module.

6. A lighting apparatus for providing illumination within a furniture module, comprising:
    a means of capturing kinetic energy of a moving part of said furniture module, said means of capturing kinetic energy comprising:
        an arm mounted on said moving part of said furniture module, said arm configured for transferring said kinetic energy to a lever arm on movement of said movable part;
    a means of converting said kinetic energy into electric energy, said means configured for receiving said kinetic energy from said lever arm;
    a means of converting said electric energy into light energy; and
    a means of attaching said lighting apparatus on said furniture module.

* * * * *